United States Patent [19]

McKee et al.

[11] Patent Number: 5,675,786

[45] Date of Patent: Oct. 7, 1997

[54] ACCESSING DATA HELD IN LARGE DATABASES

[76] Inventors: Neil Howard McKee, P.O. Box 14 Westbury on Trym, Bristol BS9 4BD, United Kingdom; Peter Phaal, 725 14th Ave., San Francisco, Calif. 94118

[21] Appl. No.: 380,908

[22] Filed: Jan. 30, 1995

[30] Foreign Application Priority Data

Jan. 31, 1994 [GB] United Kingdom ............... 9401816

[51] Int. Cl.$^6$ ................... G06F 17/30; G06F 15/30
[52] U.S. Cl. ................... 395/614; 395/233; 395/603; 395/604; 395/616
[58] Field of Search .................... 395/600, 650; 364/406

[56] References Cited

U.S. PATENT DOCUMENTS 5,093,787  3/1992  Simmons ................. 364/406
5,361,393  11/1994  Rossillo ................. 395/650
5,404,509  4/1995  Klein ................. 395/600

OTHER PUBLICATIONS

Omiecinski et al., "Performance Analysis of a Concurrent File Reorganization Algorithm for Record Clustering", IEEE Transactions on Knowledge and Data Engineering, vol. 6, No. 2, Apr. 1994.

Omiecinski et al., "Concurrent File Reorganization for Record Clustering: A Performance Study", IEEE Transactions on Knowledge and Data Engineering, 1992.

Primary Examiner—Thomas G. Black
Assistant Examiner—Cheryl R. Lewis
Attorney, Agent, or Firm—Panitch Schwarze Jacobs & Nadel, P.C.

[57] ABSTRACT

By sampling the initial result of a query to the database, thereby producing a sampled result which is substantially smaller than the initial result, the sampled result is easier to analyse statistically and is easier to transmit across a communications medium such as a network.

19 Claims, 3 Drawing Sheets

ACCESSING DATA HELD IN LARGE DATABASES

BACKGROUND OF THE INVENTION a) Field of the Invention

This invention relates to the accessing of data held in computer databases and encompasses, in particular, an efficient means of retrieving and analyzing data held in large databases.

In the day-to-day use of a conventional database, various transactions take place involving several, but rarely all, of the records contained in the database. Typically, these transactions will include creation of new records and reading, alteration or deletion of some existing records. For example, an accounts database may be accessed to create an account for a new customer, to view the account of an existing customer for the purposes of credit control, or to update the account of an existing customer when an invoice is issued or a payment is received.

Routine transactions of the abovementioned type usually involve few processing operations, even if a change to an individual record causes corresponding changes to some other records within the database. Thus, this routine access, involving occasional local operations on a limited number of records, makes few demands on the processing capacity of the computer running the database.

A computer database provides a readily-accessible collection of numerous records, which can be managed with much greater efficiency and reliability than an equivalent manual database. However, a computer database is seriously under-employed if used only in this way, because data held in the database can also be processed globally to provide an overview of information spanning most if not all of the records in the database.

Information obtained by global processing may, for example, include essential business performance indicators such as profit figures or the results of quality testing. Such information goes to the heart of process management, which involves a continuous process of gathering information, setting targets, monitoring performance by gathering further information and, if necessary, making organisational changes to ensure that performance meets the targets.

Thus, a database is a prime source of the information required for effective process management and so, if used to its fullest extent, can be an indispensable management tool. It is unfortunate, therefore, that the necessary global processing of data held in a large database massively increases the demands on processing capacity.

For example, where the database serves a large business, queries may be phrased in various ways, such as 'sales by division', 'sales by product' or 'sales by region'. Each of these various queries may require access to millions of records. Such large-scale queries necessitate powerful and thus expensive computer systems and may, for practical purposes, exceed the capacity of a business's existing computer system. If the limits of capacity are reached, this limits the potential of the database and so hinders effective process management.

Further, a large-scale query commonly takes many hours to complete and, while running, may disrupt the business's general computing functions if these share the same computer. This lengthy time delay is particularly damaging because it lessens management's ability to detect changing circumstances and to respond promptly to those changes. Thus, what should ideally be a continuous process of monitoring and control becomes an occasional audit which may be out of date even before it is completed.

Our solution to these problems employs a technique for efficiently sampling the initial result of a query to a database, thereby producing a sampled result which is substantially smaller than the initial result.

Being potentially so much smaller than the initial result, the sampled result is easier to analyse statistically and is easier to transmit across a communications medium such as a network. Thus, sampling minimises the load on the database and/or a computer system communicating with or incorporating the database.

Commonly, data held in a database is accessed by a personal computer acting across a network. When using a personal computer in this way, a network connection is established, a database query is made, and the data is returned by the database as a result. Frequently, the query is expressed in SQL, regarded as the most common language for expressing queries to a database. However, the presence of a network, the use of a PC, or the use of SQL, are not essential to the present invention.

The initial result obtained from the database is sampled to produce a sampled result, this comprising a number of sampled records substantially smaller than the number of records constituting the initial result. If, say, one record in a thousand is sampled, a result comprising one million records is reduced to a sampled result comprising one thousand sampled records. This reduction has several beneficial effects.

The principal benefit of sampling is a potentially enormous reduction in processing time and/or processing capacity. In the example given above, it is expected that the computer will perform computations on the sampled result in one-thousandth of the time that would have been taken by the same computer had the initial result been used, using one-thousandth of the memory. Further, the time required to send the sampled result across the network or other communications medium can be one thousandth of the time that would have been taken had the initial result been sent over the same network. By the same token, the network bandwidth required to transmit the sampled result in a given transmission time can be one thousandth of that required to transmit the initial result in the same transmission time.

Clearly, there is a trade-off involved in achieving the gains promised by our invention; this trade-off is a slight reduction in the accuracy of the information obtained from the database. However, the typical low level of inaccuracy is not serious, particularly for the types of analysis involved in process management, in which trends are at least as important as absolute values. Certainly, the benefits of sampling outweigh its disadvantages in the majority of applications.

Of course, if a single query is addressed to a database, the initial result obtained from that database need not be sampled in order to answer that query. Indeed, a single query can be answered more quickly and more accurately with reference to the initial result, without sampling. However, in typical process analysis, queries rarely arise singly. For example, if the initial result indicates a decline in quality, an analyst will tend to seek causes for this symptom and so will address further time-consuming queries to the database. The benefit of this method is apparent at this stage, as any further queries can be answered with reference to the sampled result without further recourse to the database.

b) Description of the Prior Art

A method of auditing a database is known from WO93/23818. Such an audit is conducted by selecting a sample to audit and presenting the sample to the user in a standardized set of reports or on-line forms. Selection of the sample to be audited involves the generation of a filtered list of records from the database which meet a predetermined filter criteria. This filtered list is then used as the base on which sampling is carried out. Records are then selected from this list on a random basis by generating random numbers between 1 and the total number of records in the list. Before being added to the sample, selected records are examined to determine whether certain skew criteria, which serve to bias the sample, are met. This biasing is effected by consecutively rejecting a certain number of records which do not meet the skew criteria and then if a predetermined sample size requirement has not been met, accepting a record regardless of whether it meets the skew criteria or not. Hence the skew does not eliminate the chance of any record being selected, although the probability of records which meet the skew criteria being selected, is greater. When a predetermined sample size requirement has been met the sampling procedure is complete.

Random sampling routines of this nature involve indexed access to data and hence are unsuitable in situations where indexed access to data is not possible. Indexed accessing of the data, in order to perform sampling, is highly computationally intensive and when dealing with large databases can involve considerable processing time. Such routines are also impractical when sampling is to be performed on a stream of data as it would involve jumping to and fro through the stream of results.

SUMMARY OF THE INVENTION

It is against this background that we have devised the present invention. Broadly stated, the invention resides in the concept of sampling a sequential stream of records from a database query result to produce a sampled result substantially smaller than the initial result.

Sampling a sequential stream of results is a single-pass operation and is less computationally intensive than sampling routines which require indexed access to data. Sequential sampling algorithms are also much more universal, as they can be used where indexed access to data is not possible, such as when text files are sampled. Even when indexed access is possible, sequential access is typically more efficient.

From one aspect, our invention resides in a method of retrieving and analysing data held in a database, comprising; addressing a query to a database to generate a sequential stream of initial result records; and sampling said sequential stream of initial result records to produce a sampled result which is substantially smaller than the initial result.

In a preferred embodiment sampling may be performed by examining all records in the initial result stream to determine whether they are sampled.

In an alternative, yet still advantageous embodiment, sampling may be performed by selecting random records in the initial result stream.

Preferably, sampling is performed as part of the database query engine or database access process so that the load on this engine or process can also be substantially reduced.

Where a client/server connection is employed, it is preferred that sampling is performed at the server end of the connection in order to minimise transmission time and costs. Sampling may be performed in the database engine or otherwise before sending the results back to the client. However, it is possible to sample the results at the client end of the connection, before or during loading of the results table into an analysis tool.

A sampling probability may be selected so that a particular sample size should be obtained from a given result.

The probability of selecting a record may be made proportional to a field in the record.

When only such data is available, sampling may be performed on a result stream containing averaged or aggregated or averaged and aggregated data.

In yet another preferred embodiment of the invention, the sampled result is analysed.

Expressed in another manner the invention resides in a method of process management comprising, addressing a query to a database to generate a sequential stream of initial result records; and sampling said sequential stream of initial result records to produce a sampled result which is substantially smaller than the initial result.

BRIEF DESCRIPTION OF THE DRAWINGS

The foregoing summary of the invention, as well as the following detailed description of the preferred embodiments, will be better understood when read in conjunction with the appended drawings. For the purposes of illustrating the invention, there are shown in the drawings embodiments which are presently preferred, it being understood, however, that the invention is not limited to the specific arrangements and instrumentalities disclosed.

DESCRIPTION OF THE PREFERRED EMBODIMENTS

Figure 1:
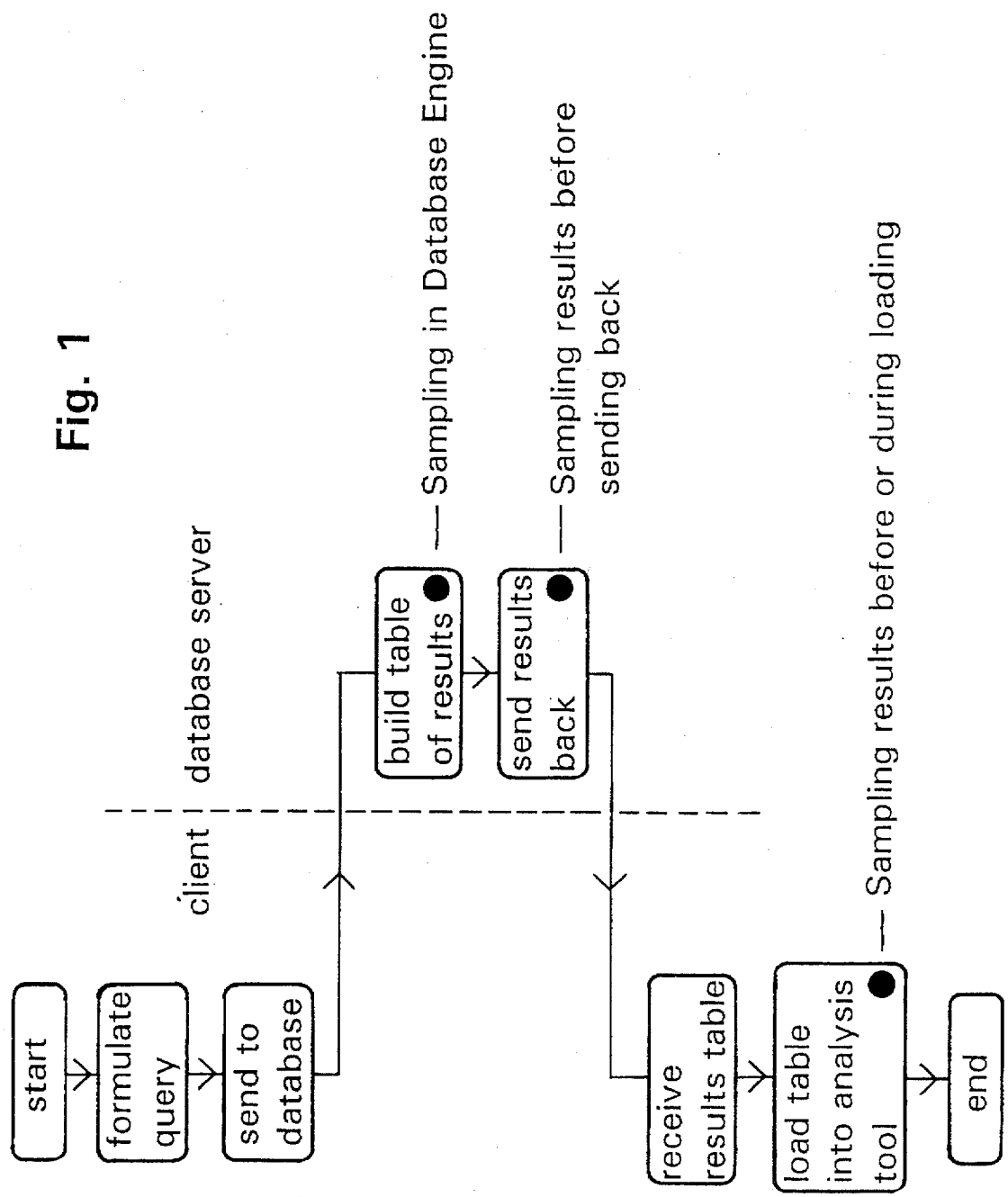
FIG. 1 is a flow diagram showing the operation of a client/database server system handling a query to the database, the flow diagram showing possible points for sampling the result obtained from the database.

Referring firstly to FIG. 1 of the drawings, a client unit formulates a query and sends the query to a database server. The database engine running on the database server builds a table of results, which is sent back to the client unit for subsequent processing or analysis in answer to the query.

FIG. 1 shows three possible points for sampling the result obtained from the database. Preferably, sampling is performed at one of the first two points, i.e. (i) as the database engine builds the table of results or (ii) after the table of results has been completed but before it is sent back to the client. This 'server-end' sampling minimises the quantity of data to be transmitted back to the client, and correspondingly reduces the transmission time and/or bandwidth. However, it is possible to employ 'client-end' sampling at the third point shown in FIG. 1, i.e. before or during the loading of the results table into an analysis tool running on the client unit.

Figure 2:
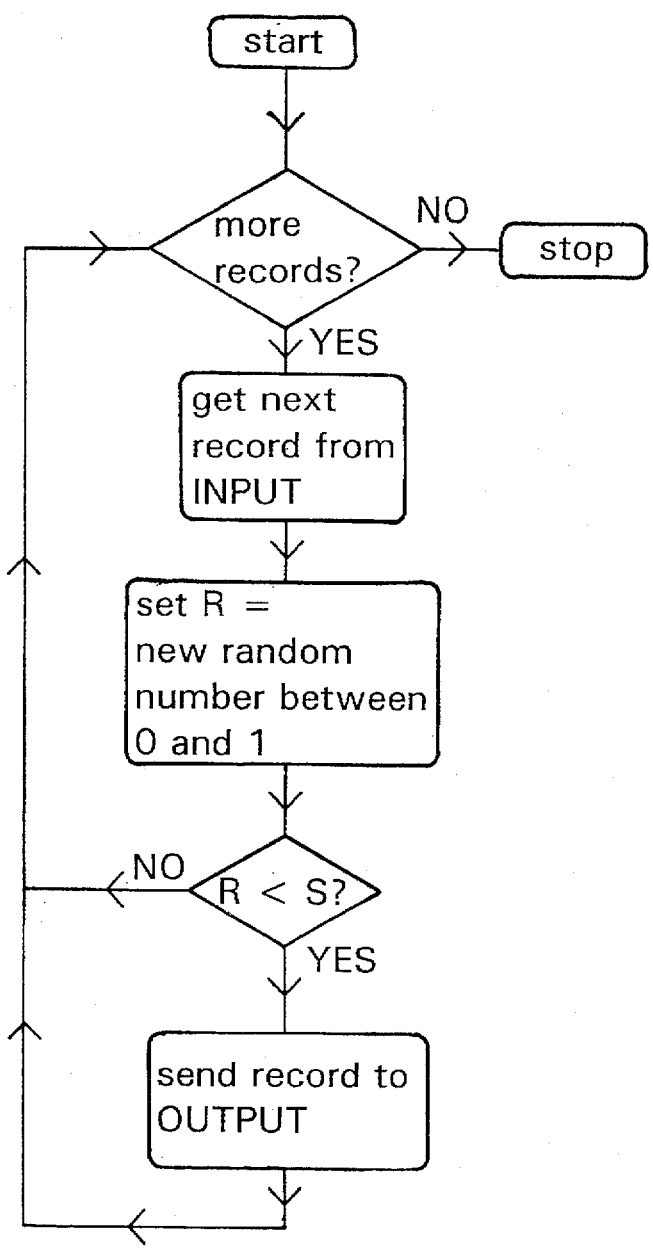
FIG. 2 is a flow diagram illustrating the operation of a sampling routine for sampling the result at a suitable point in the flow diagram of FIG. 1.

In the sampling routine illustrated in FIG. 2, INPUT is a stream of records received, for example, from a file, from a communication device, or from a database query engine either singly or in groups. OUTPUT is a stream on which the sampled records can be written, for example, to a file, to a communication device, or to a program designed to analyse the sampled result.

Before executing the sampling routine, a sampling rate is selected. This is the intended ratio of the number of records read from INPUT to the number of records written to OUTPUT. For example, if the sampling rate is set at 100 then, on average, one record will be written to OUTPUT out of every 100 records that are read from INPUT.

At the start of the sampling routine, while records remain in INPUT, the next record is obtained from INPUT and R, a randomly-generated real number between 0 and 1, is set. Thereafter, R is compared with S, a real number being the reciprocal of the sampling rate. If R is less than S, the record read from INPUT is written to OUTPUT but, if R is greater than or equal to S, the record read from INPUT is discarded. Finally, in each case, the sampling routine reverts to the start and continues to iterate through the loop until no more records are available in INPUT.

On each iteration through the loop, the sampling rate (and therefore S) remains constant while R is renewed, i.e. a new random number is generated and set as R for every record read from INPUT. This ensures a truly random selection of records from INPUT.

A sampling algorithm (in this case, a C code fragment) effecting the abovementioned sampling routine is as follows:

```
\*
random( )        returns a random number between 0 and 1
sampleRecord( )  writes out the current record and increments to the next
skipRecord( )    skips the current record and increments to the next
*\
records = 0;
threshold = 1.0 / sampling rate;
while (moreRecords( )) {
    records = records + 1;
    if (random( ) < threshold) sampleRecord( ) else skipRecord( )};
printf("%d\n", records);
```

In an alternative sampling routine, random records in the initial result stream may be sampled. Such an algorithm involves the generation of random skip count integers with a predetermined mean equal to the desired overall sampling rate. Each successive random integer determines the number of records from the input stream to skip, before examining a record. After skipping the required number of records, the next record from the input stream is selected and written to OUTPUT.

While a constant skip count is possible it can yield biased results, if there are any periodic patterns in the data being sampled, that are integral multiples of this skip count.

Whilst it is desirable to sample data that has not been operated on in any way, for example, by averaging or aggregating, since such operations can lose data that may be important in subsequent analysis, it is still necessary to have a technique for accurately sampling this data, as in some cases, only data in such a form is available from the database. The original number of records nrec averaged or aggregated to produce the averaged or aggregated result record is recorded. In order to sample data in this form correctly, each record is treated as nrec identical records.

Where the sampling rate is N and F is the total number of records in the initial result, this algorithm produces data in F/N rows, the total number of rows being recorded together with the sampled result so that the results of further analysis can be correctly scaled. If, for example, a sampled result of 1000 records includes 900 records that meet a particular criterion, one would expect 90% of the initial result also to meet that criterion, e.g. approximately 900,000 records out of 1 million.

In analysing the sampled result, various techniques common in statistics can be employed. For example, one can derive the confidence interval of the sampled result (e.g the 95% confidence interval), as follows.

If samples are divided in accordance with a given criterion, such that Sc samples out of S samples match that criterion, the probability P of a record matching the criterion is:

$$P = Sc/S$$

If the total number of records from which the sample S was drawn is F, then the estimated number of records matching the criterion, Fc, is:

$$Fc = F(Sc/S)$$

The variance of this estimate, Vc, is:

$$Vc = F^2(Sc/S^3)(S-Sc)$$

Figure 3:
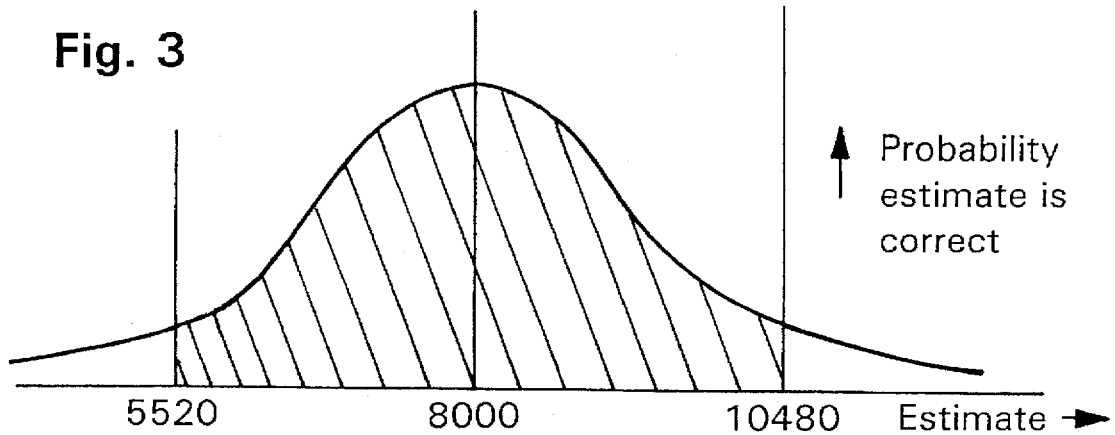
FIG. 3 is a graph showing the probability that a given estimate is correct.

If, for example, F is 20000 and a sample of F records estimates that Fc is 8000 (i.e. that 8000 of the 20000 total number of records are estimated to meet the criterion), the graph shown in FIG. 3 can be drawn to show the probability that the estimate is correct.

The curve depicted in FIG. 3 can be assumed to represent a normal distribution. For the normal distribution, a 95% confidence interval represents approximately 1.96 times the standard deviation. The standard deviation being the square root of the variance and Sc being assumed to be much smaller than S, the percentage error of Fc in a 95% confidence test is:

$$\% \text{ error} = 196\sqrt{(1/Sc)}$$

In this case, as Sc is 40, the % error on the estimate is $196\sqrt{(1/40)} \approx 31\%$ 31% of 8000 is 2480, thus enabling 95% confidence that the true number of records meeting the criterion is between 5520 and 10480.

Figure 4:
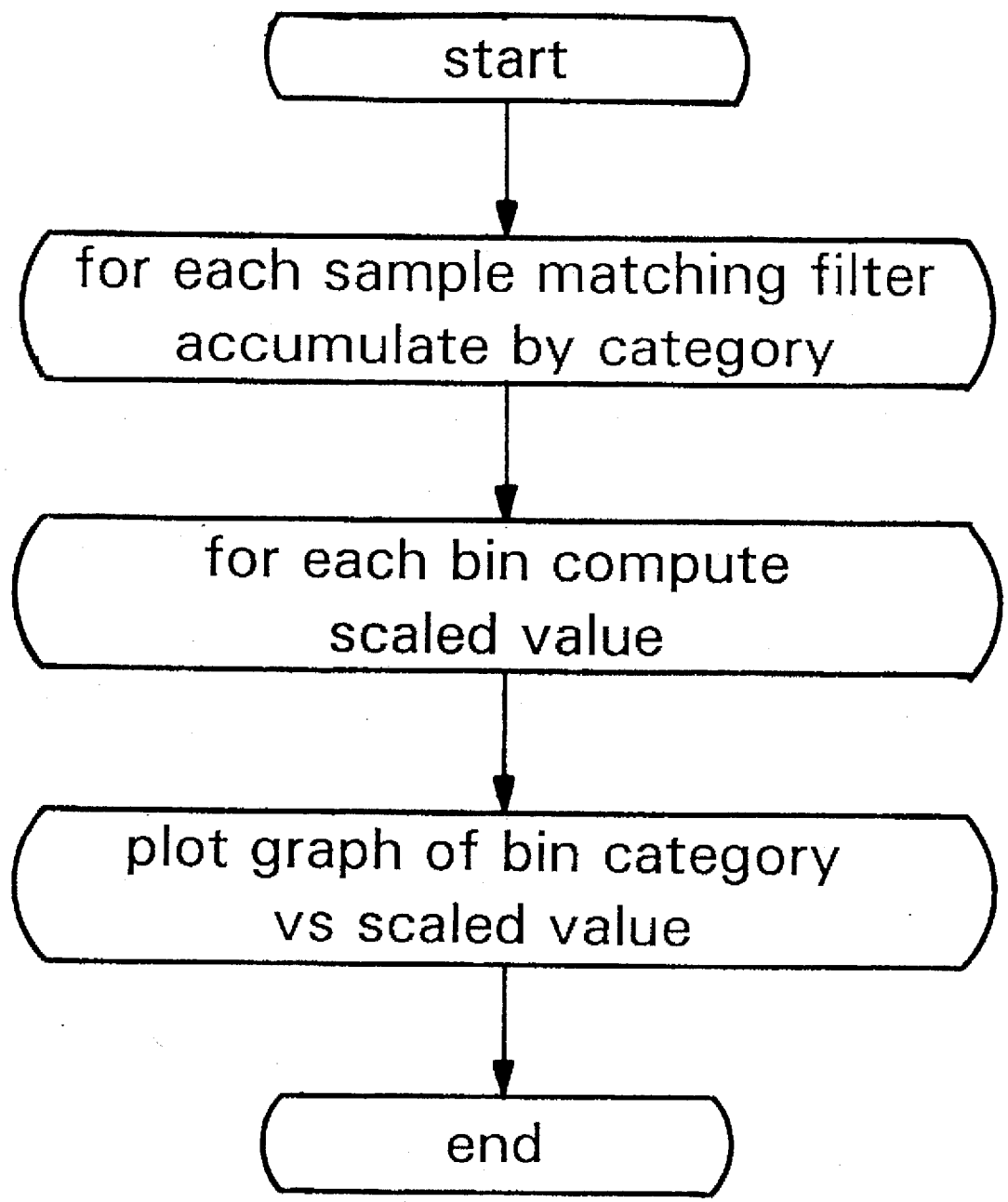
FIG. 4 is a flow diagram illustrating how a sampled result is analysed.

Analysing the sampling data in order to draw conclusions about process performance, is accomplished by the general algorithm illustrated in FIG. 4. The data may be filtered so that only part of the data is considered. Filters are generally constructed to perform subsequent analysis based on the sampled records and identify the subset of the data corresponding to the area of interest. For example, a filter may select a particular 'sales region' so that 'sales by product for a particular sales region' can be analysed.

The sampled records which match the filter are grouped by selected attributes, for example, by 'division', 'product', 'sales region' or 'division and product'. Values from sampled record attributes or values that can be computed therefrom, are accumulated by grouping as each filtered sample is examined. Once all the sampled records have been considered, the resulting accumulated values are scaled to compensate for the fact that the data has been sampled. Different scaling functions yield estimated totals, averages, record counts and variances for each category. The groupings can finally be displayed graphically.

A specific algorithm (in this case, a C code fragment) effecting the above mentioned analysis routine is as follows:

```
/*
F                                                the total number of records from which the sample was drawn
S                                                the total number of sampled records
matchesFilter(filter, sampledRecord)             true if the sampledRecord matches the filter function
createKey(categoryColumnIndices, sampledRecord)  creates a key using the selected
                                                 columns
retrieveVAccum(key)                              retrieves value-accumulator associated with key
                                                 (accumulator is created and initialized to zero when first retrieved)
firstVAccum( )                                   initializes the value-accumulator iterator so that nextVAccumu( ) will
                                                 return the first one.
moreVAccums( )                                   true if the value-accumulator iterator has not yet reached the end of
                                                 the value-accumulator collection.
nextVAccum( )                                    retrieves the next value-accumulator in the collection, and
                                                 increments the value-accumulator iterator.
sortVAccums( )                                   sorts value-accumulators according to their scaled values.
plotBarChart( )                                  plots a bar chart with a bar for each value-accumulator key, with height
                                                 equal to the value-accumulator scaled value
*/
plotHistogram(filter, categoryColumnIndices, valueColumnIndex, sampledRecords)
{
   for(recordIndex = 0; recordIndex < S; recordIndex++) {
     \* does record match filter criterion *\
     if (matchesFilter(filter, sampledRecords[recordIndex])){
       key_t*key;
       vAccum_t*vAccum;
       float value;
       \*aggregate data by selected category and accumulate
       selected values *\
       key = createKey(categoryColumnIndices,
          sampledRecords[recordIndex])
       value = sampledRecords[recordIndex][valueColumnIndex];
       vAccum = retrieveVAccum(key);
       vAccum.n = vAccum.n + 1;
       vAccum.sum = vAccum.sum + value;
       vAccum.sumSquared = vAccum.sumSquared + (value * value);
     }
   }
   \*scale accumulated values *\
   firstVAccum( );
   while(moreVAccums( )){
     vAccum_t * vAccum;
     vAccum = nextVAccum( );
     vAccum.scaledValue = F * (vAccum.sum / S);
   }
   \* sort values and plot histogram *\
   sort VAccums( );
   plotBarChart( );
}
```

If subsequent analysis is based upon the sampled records, such that further estimates are based upon or derived from the estimates initially obtained, the variance of the further estimates will be larger than that of the initial estimates. This increased variance may be offset to some extent by weighting the probability of sampling each record in accordance with the contents of a field relating to the further estimates.

The present invention may be embodied in other specific forms without departing from the spirit or essential attributes thereof and, accordingly, reference should be made to the appended claims rather than to the foregoing specification as indicating the scope of the invention.

We claim:

1. A method of retrieving and analysing data held in a database, comprising:

addressing a query to a database to generate a sequential stream of initial result records; and sampling said sequential stream of initial result records to produce a sampled result which is substantially smaller than the initial result, the initial result being the result of a query to a database.

2. A method according to claim 1 wherein all records in the initial result stream are examined to determine whether they are sampled.

3. A method according to claim 2, wherein sampling is performed by successive iterations through a loop, each iteration comprising:

generating a random number within defined limits;

reading a record;

comparing the random number with a predetermined number to determine whether a record is sampled; and selecting or rejecting the record accordingly.

4. A method according to claim 1, wherein random records in the initial result stream are sampled.

5. A method according to claim 4, wherein sampling is performed by selecting an initial record from the sequential stream of results and successive iterations through a loop, each iteration comprising:

generating a random skip count;

discarding a number of records equal to the skip count; and selecting the next record.

6. A method according to claim 1, wherein sampling is performed during database access or as a database query engine builds a table of results.

7. A method according to claim 1, wherein sampling is performed after a table of results has been completed.

8. A method according to claim 1, wherein sampling is performed during the loading of a results table into an analysis tool.

9. A method according to claim 1, further comprising transmitting the sampled result across a communications medium.

10. A method according to claim 1, comprising transmitting the initial result across a communications medium before sampling.

11. A method according to claim 1, comprising treating each record as nrec identical records when the initial result stream contains averaged or aggregated or averaged and aggregated data, where nrec is equal to the number of records averaged or aggregated to produce the averaged or aggregated record.

12. A method according to claim 1, further comprising analysing the sampled result.

13. A method according to claim 12, wherein any one, or combination of, the operations grouping, aggregating and scaling are performed on the records of the analysed sampled result.

14. A method according to claim 1, wherein the number of records in the initial result is recorded.

15. A method according to claim 1, wherein each record in the initial result stream has a predetermined probability of being sampled.

16. A method according to claim 15, wherein the probability of selecting a record is weighted in accordance with a field in the record.

17. A method according to claim 16, wherein the probability of selecting a record is proportional to a field in the record.

18. A computer database system operating according to the method as defined in claim 1.

19. A method of process management comprising:
  addressing a query to a database to generate a sequential stream of initial result records; and
  sampling said sequential stream of initial result records to produce a sampled result which is substantially smaller than the initial result.

* * * * *